(12) United States Patent
Copanas

(10) Patent No.: US 9,973,056 B2
(45) Date of Patent: May 15, 2018

(54) MOTOR MOUNTING ASSEMBLY AND METHOD OF MANUFACTURE

(71) Applicant: The Overly Hautz Motor Base Company, Lebanon, OH (US)

(72) Inventor: Thomas Copanas, Loveland, OH (US)

(73) Assignee: The Overly Hautz Motor Base Company, Lebanon, OH (US)

( * ) Notice: Subject to any disclaimer, the term of this patent is extended or adjusted under 35 U.S.C. 154(b) by 338 days.

(21) Appl. No.: 13/972,343

(22) Filed: Aug. 21, 2013

(65) Prior Publication Data
US 2015/0054369 A1    Feb. 26, 2015

(51) Int. Cl.
| | |
|---|---|
| H02K 15/14 | (2006.01) |
| F16M 1/04 | (2006.01) |
| F16M 5/00 | (2006.01) |
| F16M 7/00 | (2006.01) |
| H02K 5/26 | (2006.01) |

(52) U.S. Cl.
CPC ............ *H02K 5/26* (2013.01); *F16M 1/04* (2013.01); *F16M 5/00* (2013.01); *F16M 7/00* (2013.01); *H02K 15/14* (2013.01); *Y10T 29/49009* (2015.01)

(58) Field of Classification Search
CPC ........... H02K 5/04; H02K 15/14; H02K 5/26; F16M 7/00; F16M 5/00; F16M 1/00; F16M 1/04
USPC .......... 310/91; 248/657, 650, 656, 424, 429, 248/676, 678, 298.1, 672, 673
See application file for complete search history.

(56) References Cited

U.S. PATENT DOCUMENTS

| | | | | | |
|---|---|---|---|---|---|
| 1,511,336 | A | * | 10/1924 | Hoey | 248/656 |
| 1,974,158 | A | * | 9/1934 | Okenfuss | 248/651 |
| 2,646,951 | A | * | 7/1953 | Sloyan | H02K 5/26 248/655 |
| 2,765,997 | A | * | 10/1956 | Motts | 248/657 |
| 3,066,898 | A | * | 12/1962 | Haynes | 248/656 |
| 3,666,225 | A | * | 5/1972 | Weinberger | E03D 1/01 248/205.3 |
| 5,659,380 | A | * | 8/1997 | Kobayashi | 351/110 |
| 5,860,319 | A | * | 1/1999 | Via | B60N 2/0232 248/429 |

(Continued)

FOREIGN PATENT DOCUMENTS

CA        740318  A  *  8/1966

*Primary Examiner* — Joshua Benitez Rosario
*Assistant Examiner* — Alexander Moraza
(74) *Attorney, Agent, or Firm* — Wood Herron & Evans LLP

(57) ABSTRACT

A motor mounting assembly for mounting a motor includes a motor base and a motor mounting fixture. The motor base has an elongate slot and a threaded adjusting rod. The motor mounting fixture cooperates with the slot for securing the motor to the base and includes a fixture body and a coupling member. The fixture body includes a fixture base and first and second oppositely disposed legs. First and second apertures extend through the first and second legs and a motor fastener projects proximally from the fixture base to be received in the slot. The coupling member has a through bore aligned with the first and second apertures between the first and second legs. At least one of the first aperture, the second aperture, or the bore includes screw threads engaging the adjusting rod for adjusting a position of the motor.

6 Claims, 5 Drawing Sheets

(56) References Cited

U.S. PATENT DOCUMENTS

| | | | |
|---|---|---|---|
| 5,928,006 A * | 7/1999 | Franks, Jr. | H01R 4/36 439/443 |
| 5,975,480 A | 11/1999 | Schaefer et al. | |
| D615,847 S | 5/2010 | Tezak et al. | |
| D622,131 S | 8/2010 | Tezak et al. | |
| 2005/0120517 A1 * | 6/2005 | Bonham | E05D 5/06 16/238 |
| 2010/0044542 A1 | 2/2010 | Koga | |

* cited by examiner

MOTOR MOUNTING ASSEMBLY AND METHOD OF MANUFACTURE

TECHNICAL FIELD

The present invention relates generally to a motor mounting assembly for supporting a motor and, more particularly, to a motor mounting assembly for adjusting a position of a motor.

BACKGROUND

Motors, such as electric motors, are widely used for driving fans, conveyors, tools, and other mechanical devices. Generally, motors generate mechanical power at a rotatable output shaft that transmits through at least one mechanical coupling and ultimately to a mechanically driven device. For example, one end of a belt, or similar coupling, may be wrapped about a drive pulley on the output shaft and another end of the belt may be wrapped about a driven pulley operatively connected to a fan or other device. In turn, the belt effectively and efficiently transfers torque from the drive pulley to the driven pulley. Of course, any number of motors, mechanical couplings, and mechanical devices may be operatively connected in a mechanical system for producing simple to relatively complex machines, such as those used in industrial applications.

Proper positioning of the motor relative to the remainder of the mechanical system is important to ensure that power is transmitted through the mechanical coupling smoothly, consistently, and without creating unnecessary damage to the mechanical system. For example, even small changes in distance or alignment between the drive pulley and the driven pulley may cause power transmission to significantly fluctuate or generate mechanical wear that also reduces efficiency of the overall mechanical system. In industrial settings often requiring high power outputs, this damage and reduced efficiency can equate to significant financial loss.

For this reason, a motor may be mounted to a motor mounting assembly having one or more adjustable fixtures that provide for simple adjustments to the position and alignment of the motor. However, conventional adjustable fixtures require relatively expensive castings to accommodate various threaded fasteners that engage the adjustable fixture. Similarly, the geometry of known adjustable fixtures that accommodates these threaded fasteners tends to reduce an amount of thread engagement along the fixture that, in turn, reduces the amount of force that can safely transmit through the fixture. Thus, adjusting the position of the motor, particularly in higher power industrial settings, may be more difficult, if not impossible, without damaging the adjustable fixture and increasing the likelihood of reduced efficiency and damage to the mechanical system.

There is a need for a motor mounting assembly for supporting a motor that addresses present challenges and characteristics such as those discussed above.

SUMMARY

The present invention provides a motor mounting assembly having improved thread engagement and affordability for adjusting the position of a motor. Accordingly, the motor mounting assembly described herein provides for enhanced pulling power and a reduced likelihood of thread damage during use. While the invention will be described in connection with certain embodiments, it will be understood that the invention is not limited to these embodiments. On the contrary, the invention includes all alternatives, modifications, and equivalents as may be included within the spirit and scope of the present invention.

According an exemplary embodiment, a motor mounting assembly for mounting a motor includes a motor base and a motor mounting fixture. The motor base includes at least one elongate slot and at least one threaded adjusting rod extending proximate the slot for adjusting a position of the motor on the motor base. The motor mounting fixture cooperates with the slot for securing the motor to the motor base. In addition, the motor mounting fixture includes a fixture body with a fixture base and first and second oppositely disposed legs. The first and second legs extend distally from the fixture base. First and second apertures extend through the first and second legs respectively, and a motor fastener projects proximally from the fixture base. The motor fastener is received in the slot for securing the motor to the motor base. A coupling member is joined to the fixture body and disposed between the first and second legs. The coupling member also includes a through bore aligned with the first and second apertures. At least one of the first aperture, the second aperture, or the bore includes screw threads that threadably engage the adjusting rod such that the motor fastener moves along the elongate slot when the adjusting rod is rotated.

In another aspect, a motor mounting fixture is used with a motor base having a rotatable fastener for adjusting a position of a motor along an elongate slot. The motor mounting fixture has a fixture body and a coupling member. The fixture body includes a fixture base and first and second oppositely disposed legs projecting distally from the fixture base. First and second apertures extend through the first and second legs, respectively, and a motor fastener projects proximally from the fixture base. The coupling member is disposed between the first and second legs and has a through bore axially aligned with the first and second apertures. The motor mounting fixture includes screw threads in at least one of the first aperture, the second aperture, or bore.

In yet another aspect, a method of manufacturing a motor mounting fixture includes fabricating a fixture body with a fixture base and first and second oppositely disposed legs that project distally from the fixture base. A first aperture is formed in the first leg and a second aperture is formed in the second leg such that the first and second apertures are axially aligned. The method includes coupling a motor fastener to the fixture base to extend proximally from the base for connecting a motor. A coupling member is joined between the first and second legs such that a through bore of the coupling member is aligned with the first and second apertures. A screw thread is formed within at least one of the first aperture, the second aperture, or the through bore. The screw thread is configured to engage an adjusting rod for moving the motor fastener member within a slot of the motor base.

Various additional objectives, advantages, and features of the invention will be appreciated from a review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention, and together with a general description of the invention given above and the detailed description given below serve to explain the invention.

DETAILED DESCRIPTION

Figure 1:
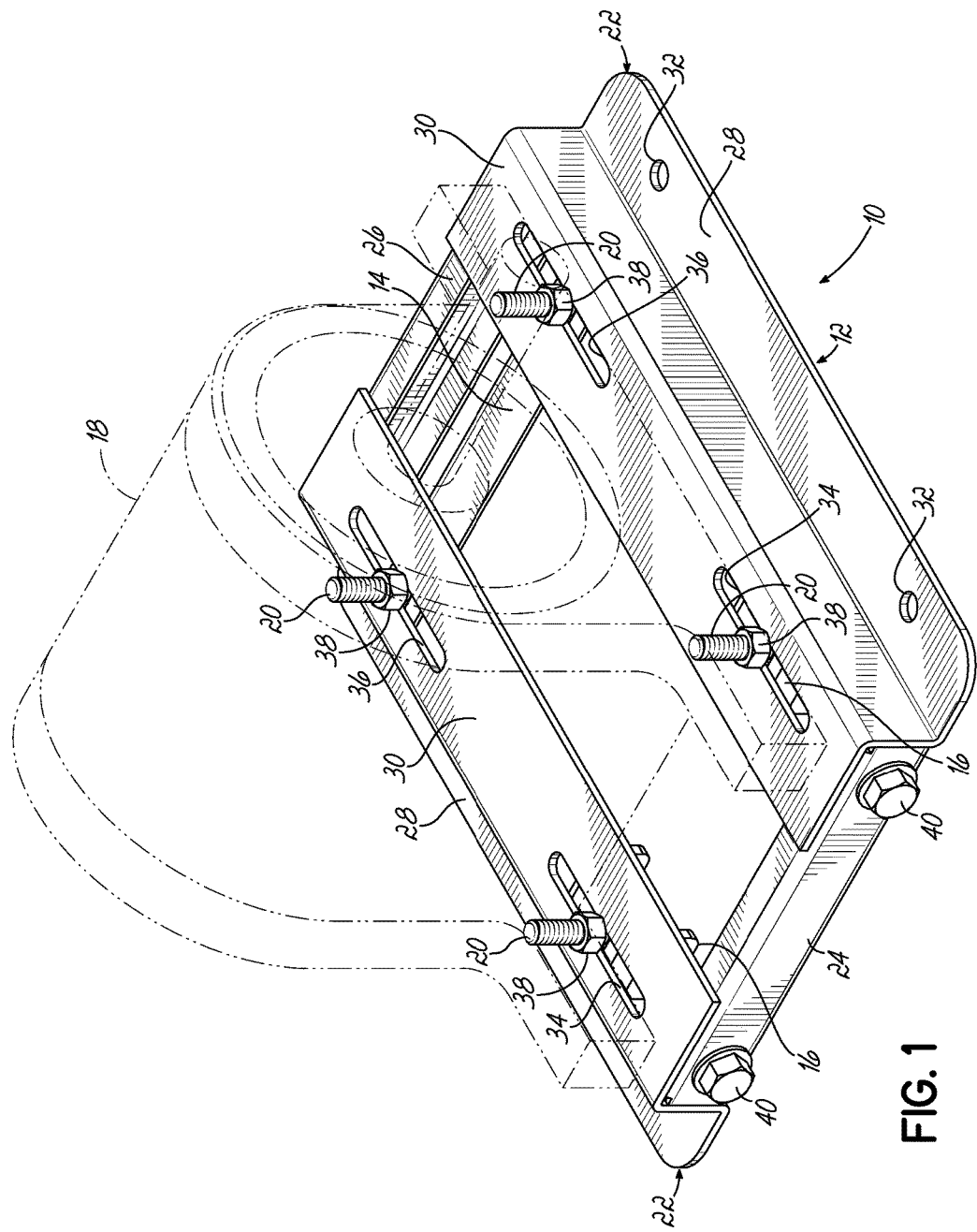
FIG. 1 is a front perspective view of an exemplary motor mounting assembly in accordance with the principles of the present invention, with a motor shown in phantom lines.
Figure 2:
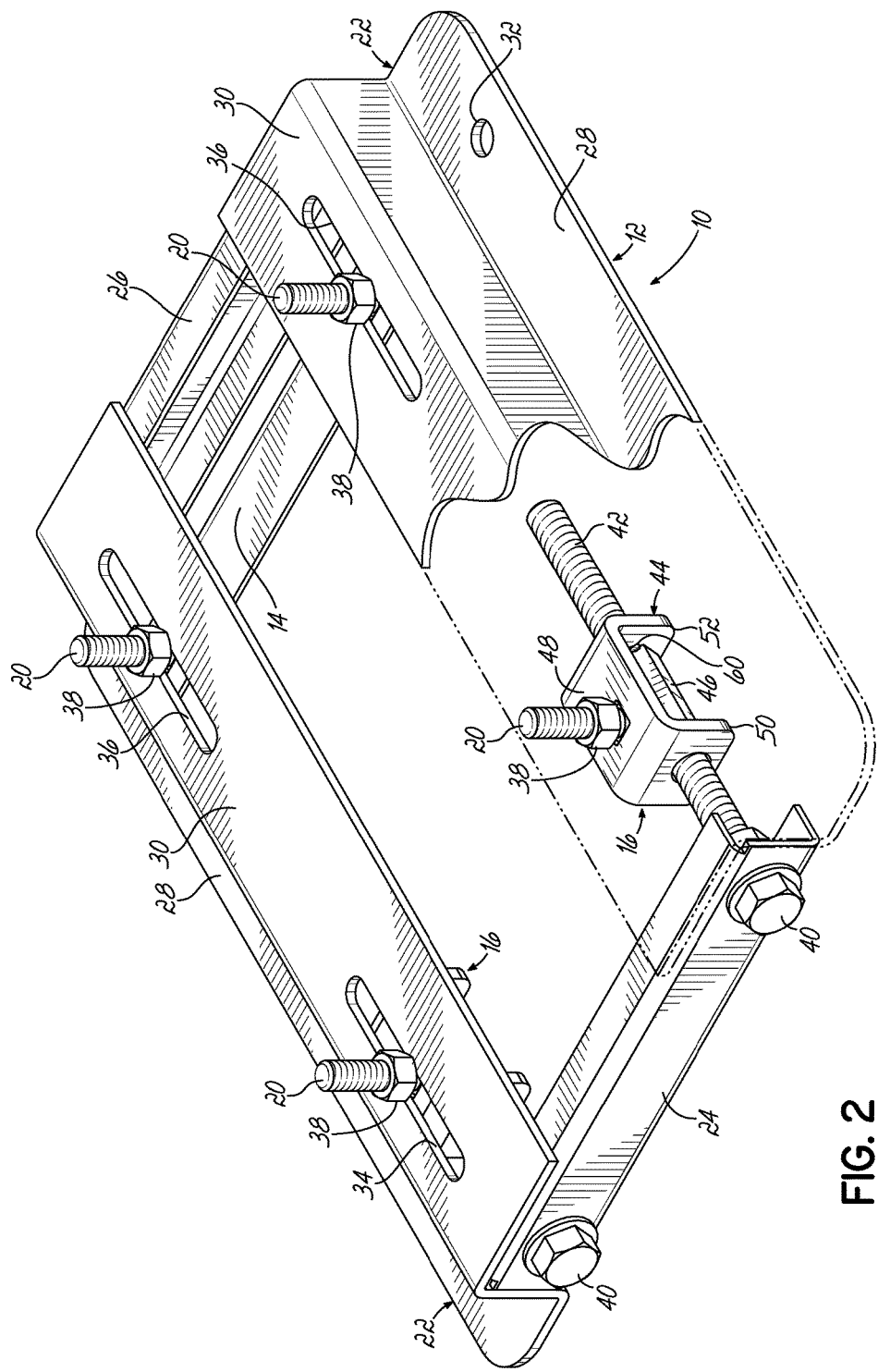
FIG. 2 is a broken front perspective view of the motor mounting assembly of FIG. 1, including an exemplary motor mounting fixture in accordance with the principles of the present invention.
Figure 3:
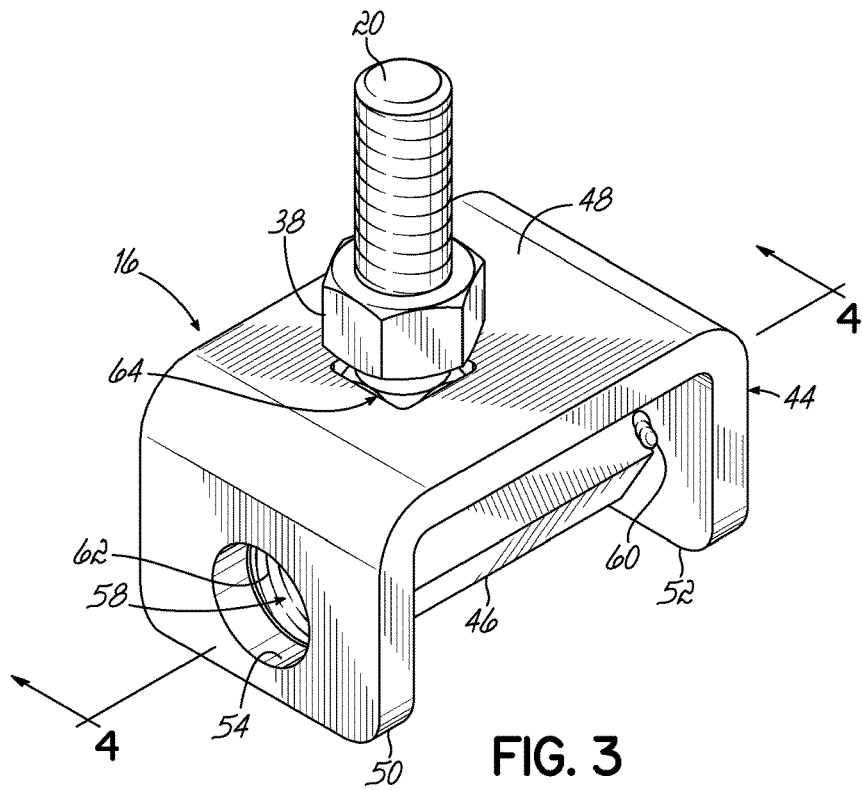
FIG. 3 is a front perspective view of the motor mounting fixture of FIG. 2.
Figure 4:
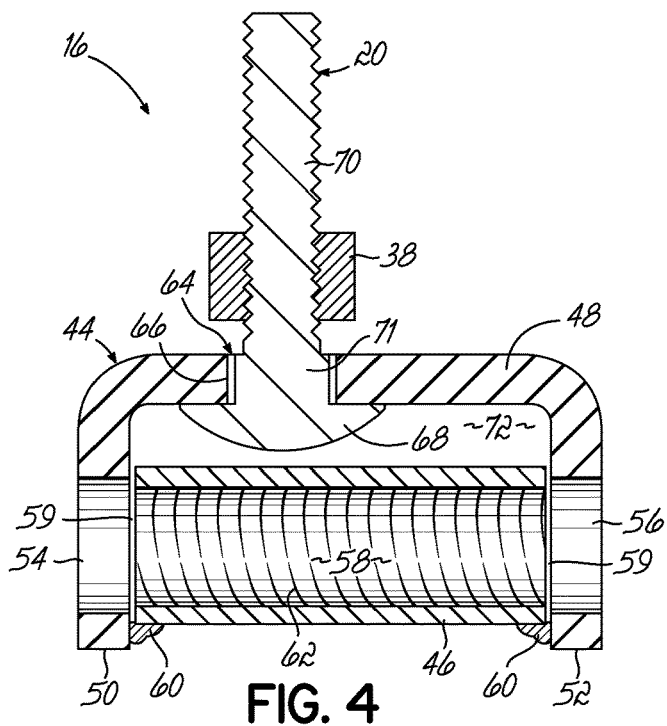
FIG. 4 is a cross-sectional view of the motor mounting fixture of FIG. 3 taken along line 4-4.
Figure 5:
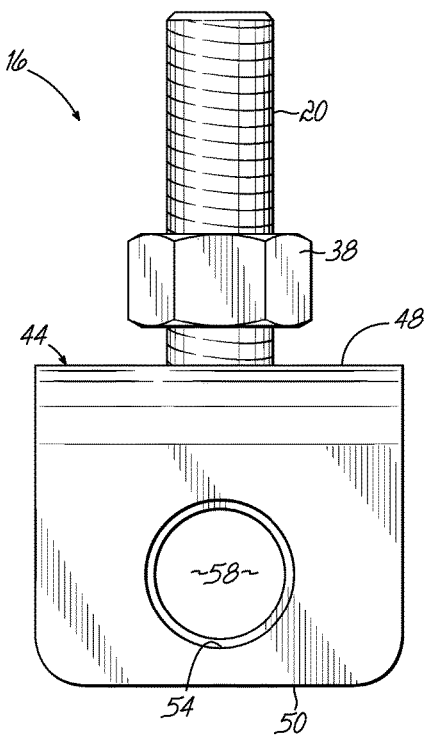
FIG. 5 is a front elevation view of the motor mounting fixture of FIG. 3
Figure 6:
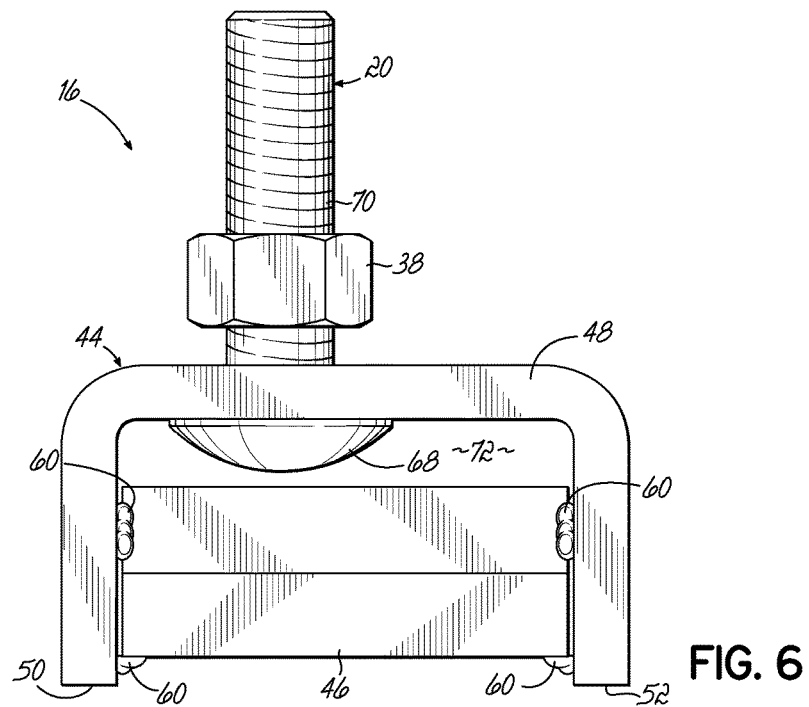
FIG. 6 is a side elevation view of the motor mounting fixture of FIG. 3.
Figure 7:
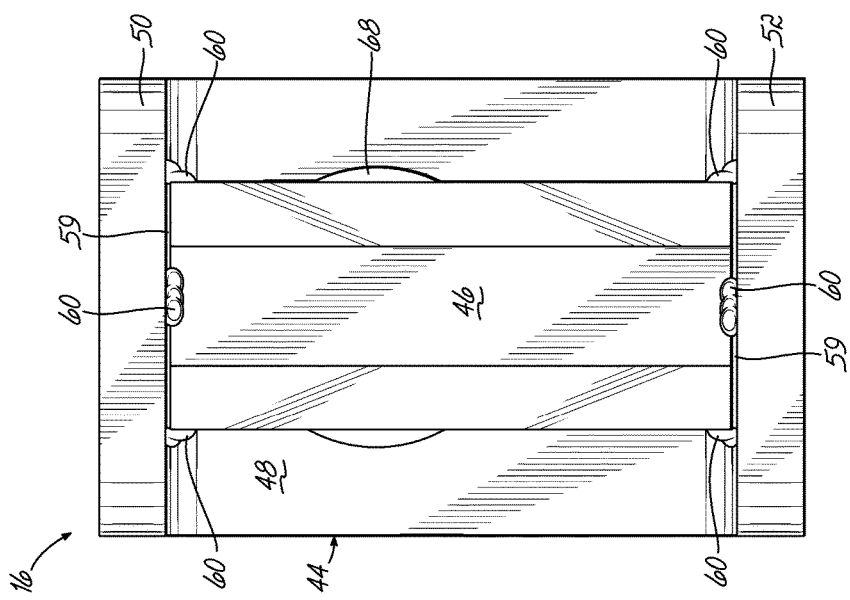
FIG. 7 is a top plan view of the motor mounting fixture of FIG. 3.
Figure 8:
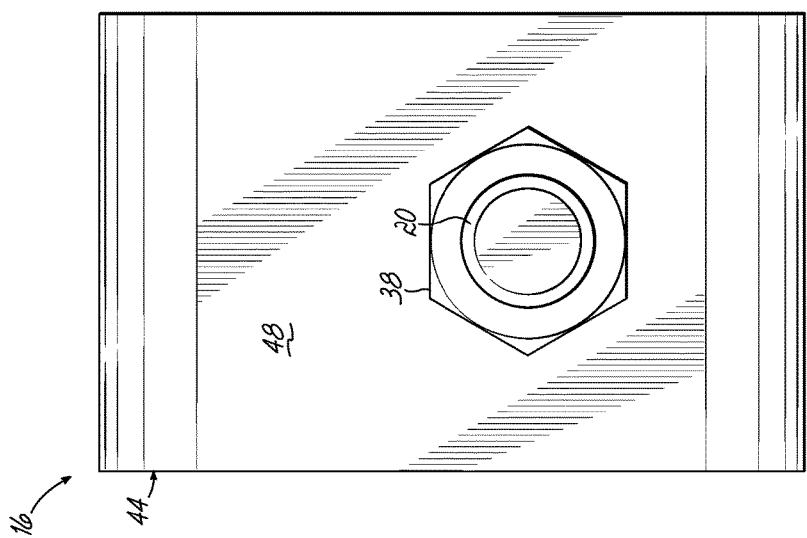
FIG. 8 is a bottom plan view of the motor mounting fixture of FIG. 3.

With reference to FIGS. 1-2, an exemplary embodiment of a motor mounting assembly 10 includes a motor base 12, an elongated member 14, and pair of motor mounting fixtures 16 for mounting a motor 18, such as an electric motor, securely to a floor, platform, or other fixed base (not shown). Each of the motor mounting fixtures 16 includes a motor fastener 20, and the elongated member 14 includes two opposing motor fasteners 20. The motor fasteners 20 are offset from each other and project proximally from the motor base 12 to engage the motor 18. The elongated member 14, and the pair of motor mounting fixtures 16 are each longitudinally adjustable along a length of the motor base 12. Accordingly, the motor mounting assembly 10 enables longitudinal positioning of the motor 18 relative to the motor base 12 and/or accommodating other motors of various size or shape. As described herein, it will be appreciated that the terms "longitudinal," "transverse," "distal," and "proximal" are intended to describe relative locations or directions along exemplary embodiments of the motor mounting assembly 10. It is not intended that the terms "longitudinal," "transverse," "distal," and "proximal" limit the invention to any exemplary embodiment described herein.

The motor base 12 includes a pair of opposing flanges 22 and first and second opposing brackets 24, 26 extending between the flanges 22. The flanges 22 extend generally parallel to each other, whereas the first and second brackets 24 are generally transverse to the flanges 22. In this respect, the flanges 22 rigidly connect to the first and second brackets 24 to form a generally rigid rectangular motor base 12. According to an exemplary embodiment, the flanges 22 are welded to the first and second brackets 24, 26 to form the generally rectangular motor base 12; however, it will be appreciated that the motor base 12 may also be rigidly connected via bolts, nuts, or other fastener components. Similarly, it will be further appreciated that the motor base 12 may be generally any shape or size for accommodating a variety of motors, and the generally rectangular shape or size of the motor base 12 is not intended to limit the invention described herein.

Each flange 22 is stepped to include a bottom portion 28 and a platform portion 30. The bottom portion 28 is generally planar and has a plurality of through holes 32 respectively receiving a plurality of fastener components (not shown) for anchoring the flange 22 to the fixed base, such as the floor. The platform portion 30 is also generally planar and supports the motor 18. According to an exemplary embodiment, each platform portion 30 includes a first elongated slot 34 offset and longitudinally aligned with a second elongated slot 36. As such, the first and second slots 34, 36 on one of the pair of flanges 22 are generally parallel with the other first and second slots 34, 36, respectively.

The elongated member 14 extends generally transversely between the flanges 22 and generally parallel to the adjacent second bracket 26. The elongated member 14 has two holes (not shown) that each receive one of the motor fasteners 20. The majority of the elongated member 14 is positioned distally from the platform portion 30 with only the motor fasteners 20 projecting proximally through the second slots 36. A fastener nut 38 may be removed from each of the motor fasteners 20 so that the motor 18 may be positioned on the motor fasteners 20 and against the platform portion 30. Once the motor 18 is positioned on the motor fasteners 20, each of the fastener nuts 38 may be hand tightened to loosely secure the motor 18 to the platform portion 30. The position of the loosely secured motor 18 may be adjusted via the longitudinally adjustable motor mounting fixtures 16 while the elongated member 14 simultaneously follows the longitudinal movement of the motor 18. Finally, the motor 18 may be rigidly secured against the platform portion 30 with further tightening of the fastener nuts 38. Of course, the fastener nuts 38 may be loosened at any time in order to adjust the position of the motor 18.

With respect to FIG. 2, the majority of each motor mounting fixture 16 is also positioned distally from the platform portion 30 with only the motor fasteners 20 projecting proximally through the first slots 34. In contrast with the elongated member 14, each motor mounting fixture 16 provides for individual longitudinal adjustment of the included motor fastener 20. According to an exemplary embodiment, a pair of adjusting rods 40 extends through the first bracket 24 and toward the second bracket 26. According to an exemplary embodiment, the adjusting rod 40 is a rotatable fastener, such as a capscrew. One of the adjusting rods 40 longitudinally aligns with the one of the first slots 34, while another of the adjusting rods 40 longitudinally aligns with the other first slot 34. Each of the adjusting rods 40 is configured to rotate and includes outer screw threads 42 that rotatably engage one of the motor mounting fixtures 16. Accordingly, the motor mounting fixtures 16 are positioned on the adjusting rods 40 and may move, via rotation of the adjusting rod 40, along the first slots 34 when the fastener nuts 38 are loosened. Of course, like the elongated member 14, the fastener nuts 38 may be tightened onto each of the motor fasteners 20 and against the platform portion 30 to secure each of the motor mounting fixtures 16 in a fixed position relative to the motor base 12.

FIGS. 3-8 show an exemplary embodiment of the motor mounting fixture 16. The motor mounting fixture 16 includes a fixture body 44 and a coupling member 46. The fixture body 44 includes a base 48 and a first leg 50 oppositely disposed from a second leg 52. In the embodiment shown, the first and second legs 50, 52 project distally from the base 48 and generally define a U-shape. In addition, the first and second legs 50, 52 include first and second apertures 54, 56 extending through each leg 50, 52, respectively. Notably, the first and second apertures 54, 56 are positioned opposite from each other and in relative axial alignment.

The coupling member 46 is disposed between the first and second legs 50, 52 and includes a through bore 58 longitudinally extending therethrough. The coupling member 46 is sized to provide a space 59 adjacent to each leg 50, 52 for receiving a weld 60 or, in the alternative, the first and second legs 50, 52 may sandwich the coupling member 46 therebetween without the space 59. In one embodiment, the coupling member 46 may be greater than 1 inch in length and, more particularly, may be greater than 2 inches in length. In another exemplary embodiment, the coupling member 46 may be approximately 2 inches in length. The coupling member 46 is rigidly connected to both the first and second legs 50, 52 with the welds 60 as shown in an exemplary embodiment. However, it will be appreciated that the coupling member 46 may also be rigidly connected with other fastener components and, as such, the invention is not intended to be limited the exemplary embodiments described herein.

Furthermore, the coupling member 46 is positioned relative to the fixture body 44 such that the through bore 58 axially aligns with the first and second apertures 54, 56. The coupling member 46 includes internal screw threads 62 within the through bore 58 configured to engage the outer screw threads 42 of the adjusting rod 40 (see FIG. 2) extending therethrough. In the embodiment shown, the first and second apertures 54, 56 do not include screw threads; however, it will be appreciated that screw threads may be included within the first and second apertures 54, 56 of alternative embodiments. According to an exemplary embodiment, the coupling member 46 is formed from a hexagonal bar stock. Alternatively, the coupling member 46 may be formed from a cylindrical bar stock, a rectangular bar stock, or any other shape or size elongate structural member sized to extend between the first and second legs 50, 52.

The base 48 further includes a third aperture 64 that receives the motor fastener 20. According to an exemplary embodiment, the third aperture 64 extends through the base 48 and is positioned proximally from the coupling member 46 along the transverse direction of the base 48. However, the third aperture 64 is generally closer to the first leg 50 than the second leg 52 and, as such, is generally off center along the longitudinal direction of the base 48. The off center position of the third aperture 64 provides for full longitudinal movement of the motor mounting fixture 16 along the first slot 34 (see FIGS. 1-2) by accommodating for the length of the coupling member 46. In the embodiment shown, the third aperture 64 includes at least one inner, non-circular portion 66 cooperating with the motor fastener 20 to inhibit rotation of the motor fastener 20 therein.

In this respect, the motor fastener 20 includes a head 68 and a bolt shank 70 projecting from the head 68. The shank 70 includes at least one outer non-circular portion 71 that engages with the inner non-circular portion 66 of the third aperture 64 that inhibits relative rotation, but provides for the shank 70 to otherwise move proximally and/or distally within the third aperture 64. According to an exemplary embodiment, the motor fastener 20 within the third aperture 64 is a carriage bolt and the outer non-circular portion 66 is generally square with four flat portions. Similarly, the inner non-circular portion 71 is also generally square with four flat portions that are sized to engage the four flat portions of the motor fastener 20 to inhibit rotation. It will be appreciated, however, that non-circular portions 66, 71 may have various other shapes configured to inhibit rotation of fastener 20 in the third aperture 64. Alternatively, the motor fastener 20 may be a hex bolt or other mechanical fastener affixed to the motor mounting fixture 16.

While the third aperture 64 may allow proximal and/or distal movement of the motor fastener 20, the head 68 is captured within a gap 72 defined by the coupling member 46 and the base 48. Specifically, the shank 70 is longer than the gap 72 such that, when the motor fastener 20 is partially withdrawn from the third aperture 64, the head 68 abuts the coupling member 46 before the shank 70 can be fully withdrawn from the third aperture 64. In this sense, the coupling member 46 captures the head 68 within the gap 72 and the shank 70 within the third aperture 64. Alternatively, the base 48 may not include the third aperture 64 cooperating with the motor fastener 20 to inhibit rotation therebetween. Rather, the motor fastener 20 may be welded, brazed, or otherwise affixed to the motor mounting fixture 16 in such as way as to project proximally from the base 48 as described herein.

In an exemplary embodiment, the motor mounting fixture 16 may be manufactured by fabricating the fixture body 44 from a planar unitary plate. A first end portion of the plate may be bent along a first bending axis to form the first leg 50. An opposing second end portion of the plate may be bent along a second bending axis to form the second leg 52, and, in turn, define the fixture base 48 therebetween. The first and second legs 50, 52 may be bent until each projects distally from the fixture base 48 at generally a right angle.

The first and second apertures 54, 56 may be formed by drilling, punching, laser cutting, or any other known process for manufacturing a hole. Accordingly the first aperture 54 is formed in the first leg 50 and the second aperture 56 is formed in the second leg 52. More particularly, the first and second apertures 54, 56 are formed in axial alignment with each other.

For securing the motor 18 as shown in FIG. 1, the motor fastener 20 is coupled to the fixture base 48. Specifically, the third aperture 64 is formed in the fixture base 48 and receives the selected motor fastener 20, such as the carriage bolt. The shank 70 is inserted into the third aperture 64 and projects proximally from the fixture base 48.

The coupling member 46 may be formed by sizing and cutting bar stock, or other elongate structural member, to fit between the first and second legs 54, 56. The through bore 58 and internal screw thread 62 may be drilled and tapped longitudinally through the coupling member 46. After the shank 70 is inserted into the third aperture 64, the coupling member 46 may then be joined to the fixture body 44 to capture the head 68 of the motor fastener 20 in the gap 72. In the embodiment shown, the coupling member 46 is welded to the first and second legs 50, 52 of the fixture body 44. It will be appreciated, however, that various other methods for joining coupling member 46 to fixture body 44 may alternatively be used.

Finally, the motor fastener 20 is positioned through the first or second elongate slot 34, 36 of a motor base 12 as described above. The adjusting rod 40 is rotated to threadably engage the internal screw threads 62 and adjust the longitudinal position of the motor mounting fixture 16 relative to the first or second slots 34, 36. The motor 18 is fastened to each motor fastener 20 for securing the motor 18 to the motor base 12 with the motor nuts 38 as described above. An exemplary embodiment of the motor mounting assembly 10 includes two motor mounting fixtures 16 and, as such, the manufacture and assembly of the motor mounting fixture 16 to the motor base 12 is repeated as described above for the second motor mounting fixture 16. However, it will be appreciated that other motor bases may include more or less elongate slots 34, 36 for use with more or less of the motor mounting fixtures 16, respectively. As such, the invention described herein is not intended to be limited to an exemplary motor base 12 having only two slots 34, 36 for use with two motor mounting fixtures 16.

While the present invention has been illustrated by the description of one or more embodiments thereof, and while the embodiments have been described in considerable detail, they are not intended to restrict or in any way limit the scope of the appended claims to such detail. Various features of the motor mounting assembly 10 shown and described herein may be used alone or in any combination. Additional advantages and modifications will readily appear to those skilled in the art. The invention in its broader aspects is therefore not limited to the specific details, representative apparatus and method and illustrative examples shown and described. Accordingly, departures may be from such details without departing from the scope or spirit of the general inventive concept.

What is claimed is:

1. A motor mounting assembly, comprising:
   a motor base for supporting a motor thereon, said motor base including at least one elongate slot and at least one threaded adjusting rod extending proximate said at least one elongate slot for adjusting a position of the motor thereon; and
   a motor mounting fixture cooperating with said at least one elongate slot for securing the motor to said motor base, said motor mounting fixture comprising:
      a fixture body having a fixture base and first and second oppositely disposed legs extending distally from said fixture base,
      first and second apertures through said first and second legs, respectively,
      a third aperture in said fixture base, wherein said third aperture is closer to said first leg than said second leg along a longitudinal direction of said fixture base;
      a bolt having a head and a threaded length extending through said third aperture of said fixture base and said at least one elongate slot for securing the motor to said motor base, said head of said bolt is captured within a gap between said coupling member and said fixture base, and
      a coupling member joined to said fixture body and disposed between said first and second legs, said coupling member having a through bore aligned with said first and second apertures; said coupling member is offset from said fixture base to define said gap therebetween; and
   at least one of said first aperture, said second aperture, or said through bore including screw threads threadably engaged with said adjusting rod such that said fixture body moves along said elongate slot of said motor base when said adjusting rod is rotated.

2. The motor mounting assembly of claim 1, wherein said coupling member is configured to be disposed under a leg of the motor when said motor base supports the motor.

3. The motor mounting assembly of claim 1, wherein said through bore of said coupling member has a length of at least two inches for threadably engaging said adjusting rod.

4. The motor mounting assembly of claim 1, wherein said bolt includes a bolt shank having a non-circular portion, and wherein said third aperture is shaped to cooperate with said non-circular portion such that rotation of said bolt within said third aperture is inhibited.

5. The motor mounting assembly of claim 1, wherein said fixture base and said first and second legs of said fixture body generally define a U-shape.

6. The motor mounting assembly of claim 1, wherein said fixture body moves in a first longitudinal direction along said elongate slot when said adjusting rod is rotated in a first rotational direction, and wherein said fixture body moves in a second longitudinal direction along said elongate slot when said adjusting rod is rotated in a second rotational direction, said second longitudinal direction being opposite said first longitudinal direction.

* * * * *

UNITED STATES PATENT AND TRADEMARK OFFICE
CERTIFICATE OF CORRECTION

PATENT NO. : 9,973,056 B2
APPLICATION NO. : 13/972343
DATED : May 15, 2018
INVENTOR(S) : Copanas Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 505 days.

Signed and Sealed this
Fifth Day of February, 2019

Andrei Iancu
*Director of the United States Patent and Trademark Office*